(12) United States Patent
Nyegaard et al.

(10) Patent No.: US 10,645,496 B2
(45) Date of Patent: May 5, 2020

(54) COMMUNICATION SYSTEM FOR COMMUNICATING AUDIO SIGNALS BETWEEN A PLURALITY OF COMMUNICATION DEVICES IN A VIRTUAL SOUND ENVIRONMENT

(71) Applicant: Sennheiser Communications A/S, Ballerup (DK)

(72) Inventors: Lars Elliot Nyegaard, Ballerup (DK); Svend Feldt, Ballerup (DK); Andreas Jessen, Ballerup (DK)

(73) Assignee: SENNHEISER COMMUNICATIONS A/S, Ballerup (DK)

( * ) Notice: Subject to any disclaimer, the term of this patent is extended or adjusted under 35 U.S.C. 154(b) by 0 days.

(21) Appl. No.: 16/122,084

(22) Filed: Sep. 5, 2018

(65) Prior Publication Data
US 2019/0075399 A1 Mar. 7, 2019

(30) Foreign Application Priority Data

Sep. 6, 2017 (EP) ..................................... 17189586

(51) Int. Cl.
*H04R 3/12* (2006.01)
*H04R 5/04* (2006.01)
(Continued)

(52) U.S. Cl.
CPC .............. *H04R 5/033* (2013.01); *A63F 13/87* (2014.09); *H04L 12/1827* (2013.01);
(Continued)

(58) Field of Classification Search
CPC ......... H04M 3/568; H04R 27/00; H04R 5/04; H04N 9/3161; H04N 9/3173;
(Continued)

(56) References Cited

U.S. PATENT DOCUMENTS

| 4,949,169 A * | 8/1990 | Lumelsky ............... H04N 7/148 345/2.2 |
| 6,241,612 B1 * | 6/2001 | Heredia ................. A63F 13/12 463/42 |

(Continued)

FOREIGN PATENT DOCUMENTS

EP  3 208 992 A1  8/2017

*Primary Examiner* — Lun-See Lao
(74) *Attorney, Agent, or Firm* — Birch, Stewart, Kolasch & Birch, LLP (57) ABSTRACT

The present invention relates to a communication system for communication of a plurality of stereo audio signals between a plurality of communication devices, wherein the plurality of communication devices comprises a first communication device, a second communication device and at least a third communication device. Each communication device of the plurality of communication devices may comprise a signal processing unit, an audio interface configured to receive a local voice signal of a user of the communication device, a binaural rendering unit configured to render the local voice signal into a stereo local voice signal based on a first spatial information, an input communication interface configured to receive a first stereo audio signal and a second stereo audio signal of the plurality of stereo audio signals transmitted by the second communication device and the third communication device, respectively. The first stereo audio signal may comprise a second voice signal of a second user of the second communication device, and the second voice signal may include a second spatial information, and wherein the second stereo audio signal may comprise a third voice signal of a third user of the third communication device, and where the third voice signal may include a third spatial information. Furthermore, the communication device may comprise an output communication interface configured to transmit a third stereo audio signal of the plurality of stereo audio signals comprising the
(Continued)

local voice signal provided with the first spatial information to the second communication device and the third communication device. The first stereo audio signal and the second stereo audio signal may be transmitted to the audio interface, and the user of the communication device experiences a virtual sound environment, wherein the second voice signal and the third voice signal is positioned in the virtual sound environment based on the second spatial information and the third spatial information, respectively.

15 Claims, 8 Drawing Sheets

(51) Int. Cl.
| | |
|---|---|
| *H04S 1/00* | (2006.01) |
| *H04S 7/00* | (2006.01) |
| *H04R 5/033* | (2006.01) |
| *H04L 12/18* | (2006.01) |
| *A63F 13/87* | (2014.01) |
| *H04L 12/58* | (2006.01) |
| *H04M 3/56* | (2006.01) |

(52) U.S. Cl.
CPC ............. *H04L 51/046* (2013.01); *H04R 3/12* (2013.01); *H04R 5/04* (2013.01); *H04S 1/005* (2013.01); *H04S 7/30* (2013.01); *H04M 3/568* (2013.01); *H04R 2420/07* (2013.01); *H04R 2420/09* (2013.01); *H04R 2430/01* (2013.01); *H04S 2400/11* (2013.01); *H04S 2420/01* (2013.01)

(58) Field of Classification Search
CPC .. H04S 2420/01; H04S 2400/11; H04S 7/302; H04S 2400/03; H04S 7/304; H04S 2400/15; H04S 7/30; H04S 2400/01; H04S 3/00; H04S 7/303; H04S 1/005; H04S 2420/03; H04S 2400/13; H04S 3/004; H04S 5/00; H04S 1/002; H04S 2400/05; H04S 2420/07; H04S 2420/11; H04S 3/002; H04S 3/008; H04S 1/007; G10L 19/008; G10L 19/20; G10L 19/0018; G10L 21/04; G10L 19/087; G10L 15/1822; G10L 17/005; G10L 17/26; G10L 21/0205
USPC .................... 381/92, 310, 312; 370/260, 266
See application file for complete search history.

(56) References Cited

U.S. PATENT DOCUMENTS

| | | | |
|---|---|---|---|
| 6,850,496 | B1 | 2/2005 | Knappe et al. |
| 8,351,589 | B2* | 1/2013 | Acero .................... H04R 27/00 370/260 |
| 8,475,279 | B2* | 7/2013 | Danieli .................. A63F 13/12 463/42 |
| 8,571,695 | B2 | 10/2013 | Reiss et al. |
| 8,602,892 | B1 | 12/2013 | Reiss et al. |
| 10,079,941 | B2* | 9/2018 | Dickins ................ H04M 9/085 |
| 2003/0081115 | A1* | 5/2003 | Curry ...................... H04M 3/56 348/14.12 |
| 2008/0004729 | A1* | 1/2008 | Hiipakka ................. H04R 5/04 700/94 |
| 2015/0334505 | A1* | 11/2015 | Crutchfield .......... H04R 29/002 381/17 |
| 2016/0006879 | A1 | 1/2016 | Dickins et al. |
| 2017/0078820 | A1* | 3/2017 | Brandenburg .......... H04S 7/304 |
| 2017/0171685 | A1* | 6/2017 | Ballard ................... H04S 7/303 |
| 2018/0213344 | A1* | 7/2018 | Laaksonen ............. G06F 3/012 |

* cited by examiner

COMMUNICATION SYSTEM FOR COMMUNICATING AUDIO SIGNALS BETWEEN A PLURALITY OF COMMUNICATION DEVICES IN A VIRTUAL SOUND ENVIRONMENT

TECHNICAL FIELD

The disclosure relates to a communication system configured for enabling chatting between users in a virtual sound environment.

BACKGROUND

For gaming, the participants often form a group consisting of three or more users. In order to be successful in the gaming they need to communicate with each other typically by connecting their devices together wirelessly or wired. Currently the voice is captured in mono (one channel) and distributed to the other participants in the group as a mono signal. When mono is played back over stereo headphones the mono voice signals will appear in the center of the receiver's head also known as lateralization. At the same time, and since the voices of the other participants are also distributed and received in mono, all the voices of the group will appear in the same lateralized position inside the receiver's head. If all the group participants speak at the same time it can be hard to separate the voices from each other because of the lateralization and therefore important information may be lost.

The same problem appears in regular communication systems, such as Skype, Lync or other kind of telephone communication systems. In a conference call situation, the users/participants talk at the same time and which makes is hard for the participants to separate the voices from each other because of the lateralization and therefore important information may be lost.

The aim of the invention is to overcome above mentioned lateralization and enable each of participants in a group to position themselves in a virtual sound environment which when received and played back over stereo headphones the voices from the participants are separated in the virtual sound environment making telephone conversation easier to understand.

U.S. Pat. No. 8,602,892 B1 centralizes all audio from each gaming console and distributes it out to each individual user. This is a complex setup and does not allow each individual user any controls. The solution requires a technician as also described in the patent to control the sound distribution in the system.

U.S. Pat. No. 8,571,695 B1 discloses a communication daisy chaining which is a relatively simple method to achieve game chat audio sharing. The system offers little control for each individual user, specifically there are no controls of the sound level of the microphone signal from each individual user that is sent over the daisy chain connection.

There is a need to provide a solution that addresses at least some of the above-mentioned problems.

SUMMARY

An object of the present disclosure is to provide a communication system and a communication device which overcomes the lateralization by enabling each of participants in a group to position themselves in a virtual sound environment.

A further object of the present disclosure is to provide a communication system for gaming which improves the communication in the game, and thereby, obtaining an improved experience of the game.

Another object of the present disclosure is to provide a communication system and a communication device which provide an improved control of audio signals received and/or transmitted by each communication device.

An additional object of the present disclosure is to provide a communication system and a communication device which are easier to use and easier to couple with other communication devices while keeping the convenience to each user since the communication device can be placed within reach of the users allowing them personal controls.

An object of the present disclosure is to provide a communication system for communication of a plurality of stereo audio signals between a plurality of communication devices, wherein the plurality of communication devices comprises a first communication device, a second communication device and at least a third communication device. Each communication device of the plurality of communication devices may comprise a signal processing unit, an audio interface configured to receive a local voice signal of a user of the communication device, a binaural rendering unit configured to render the local voice signal into a stereo local voice signal based on a first spatial information, an input communication interface configured to receive a first stereo audio signal and a second stereo audio signal of the plurality of stereo audio signals transmitted by the second communication device and the third communication device, respectively. The first stereo audio signal may comprise a second voice signal of a second user of the second communication device, and the second voice signal may include a second spatial information, and wherein the second stereo audio signal may comprise a third voice signal of a third user of the third communication device, and where the third voice signal may include a third spatial information. Furthermore, the communication device may comprise an output communication interface configured to transmit a third stereo audio signal of the plurality of stereo audio signals comprising the local voice signal provided with the first spatial information to the second communication device and the third communication device. The first stereo audio signal and the second stereo audio signal may be transmitted to the audio interface, and the user of the communication device experiences a virtual sound environment, wherein the second voice signal and the third voice signal is positioned in the virtual sound environment based on the second spatial information and the third spatial information, respectively.

The advantage of the communication system including the binaural rendering unit is that the lateralization is minimized since it enables the users of the communication devices to position each of the users in a virtual sound environment. The minimization of the lateralization is provided by the separation of the voices in the virtual sound environment leading to a more understandable communication between the communication devices and the users.

The communication system may be an online or a long range communication system for communicating stereo audio signals between the plurality of communication devices. Each of the stereo audio signals transmitted by each of the communication devices may include the voices of the respective users of the respective communication devices, where the voices of the respective users are separated in the virtual sound environment. Each of the communication devices may be a computer, laptop, tablet or a smartphone.

For example, in a communication system similar to for example Skype or Lync, the users of the communication devices are able to communicate long distantly with each other. Each user receives audio signals (i.e. stereo audio signals) from the other communication devices. Each stereo audio signal includes the voice of a user of the communication device. The stereo audio signals from each user will be distributed in the virtual sound environment in a way that the user receiving the stereo audio signals from the other communication devices will be able to distinguishing between the voices due to the separation of the stereo audio signals in the virtual sound environment. In that regards, the communication system is suitable for conference call between multiple users, such as three or more users. Each of the communication devices may be a computer, smartphone, tablet, smartwatch, PC or a laptop.

The plurality of communication devices comprising the first communication device, the second communication device and at least the third communication device, the second communication device may be a subsequent communication device in regards to the first communication device and the third communication device may be a preceding communication device in regards to the first communication device.

The communication system may be a wired or a short range communication system for communicating stereo audio signals between the plurality of communication devices. Each of the stereo audio signals transmitted by each of the communication devices may include the voices of the respective users of the respective communication devices, where the voices of the respective users are separated in the virtual sound environment. Each of the communication devices may be a gaming controller, audio gaming controller or a control device.

For example, in a communication system for gaming purposes, the users of the communication devices are able to communicate with each other and within a short range. The users may be positioned distantly from each other but within the vision of each user, and in a gaming situation stressful moments will appear where for example all users are talking at the same time. The binaural rendering unit in the communication system provides the virtual sound environment where the voices of the users are separated and positioned. This is ideally since the chances to understand what is being said when all users are talking at the same time will be improved significantly. This may lead to a better performance in the game.

The audio interface may comprise a wireless interface and/or a wired interface. Thereby, the audio interface may be configured to receive the local voice signal of the user of the communication device via a wired connection or a wireless connection from a headset, hearing aid including own voice detection or a headphone. The wired interface may be configured to receive a phono plug, a jack plug, an USB plug or any other audio plug. The wireless interface may be based on DECT and Bluetooth/Bluetooth low energy.

The communication device may be configured to be coupled wirelessly or wired via the audio interface to a hearing device, such as a headset, a headphone, a speaker or a hearing aid including own voice detection.

Furthermore, the audio interface may be configured to receive the internal audio signal and transmit the internal audio signal to a hearing device.

The user may receive the voices of the other users via an auxiliary device being a speaker, a headset, a hearing aid, or a headphone connected to the audio interface. The audio interface may be an audio port.

The local voice signal may be a stereo audio signal or a mono audio signal.

The input communication interface and the output communication interface may be part of an audio port or divided into each audio port. Alternatively, the input communication interface and the output communication interface may be part of a transceiver interface configured to transmit and receive stereo audio signals wirelessly. Thereby, the input communication interface and the output communication interface may be connectable to other communication devices via a wireless link. Additionally or alternatively, the input communication interface and the output communication interface may be connectable to other communication devices via wires.

Then, each of the communication device of the plurality of communication devices may be configured to communicate wirelessly or wired with each other via the input communication interface and the output communication interface.

In the case where the input communication interface and the output communication interface is a transceiver interface then the communication device comprises an antenna connected to the transceiver. The antenna and the transceiver are configured to communicate at about 2.45 GHz, or about 5.5 GHz. The antenna and the transceiver are configured to transmit and receive stereo audio signals and data information, such as the spatial information.

The communication system may comprise an audio mixer configured to mix the first stereo audio signal and the second stereo audio signal. The communication system may comprise a server including the audio mixer, and where the server may be configured to communicate wirelessly or wired the first stereo audio signal and the second stereo audio signal mixed together to the input communication interface. Each communication device is configured to transmit the local voice signal or the first stereo audio signal and the second stereo audio signal to the server.

Alternatively, each communication device of the plurality of communication devices may comprise the audio mixer configured to transmit the first stereo audio signal and the second stereo audio signal mixed together to the audio interface.

The audio mixer may be an 1 to N mixer. The audio mixer is configured to mix the stereo audio signals and remove any local voice signal in relative to the communication device.

The binaural rendering unit may be configured to apply a direct head related transfer function, a cross head related transfer function and/or a reverberation function to the local voice signal based on the spatial information. The spatial information may comprise an azimuth angle and/or an elevation angle, where the angles are determined with respect to a main axis intersecting a virtual position in the virtual sound environment. The azimuth angle determines the angle in right-left direction relative to the user and the elevation angle determines the angle in an upwards-downwards direction relative to the user.

The azimuth angle and the elevation angle may be between 0 and 360 degrees.

The virtual position may be determined via a user interface or dynamically changed according to a virtual gaming environment.

The spatial information may be determined via a user interface or dynamically changed according to a virtual gaming environment.

The virtual gaming environment may be a graphical user interface showing the positions of the users in the virtual gaming environment. For example, the virtual gaming environment may comprise four users where the spatial information of each users is determined in relative to their position in the virtual gaming environment. The spatial information may change according to changes of the virtual gaming environment, such as rotation, zoom in or out of the graphical user interface, or according to the coordinates of the position of the users in the virtual gaming environment.

The virtual position and the main axis may determine how the spatial information is positioned in the virtual sound environment based on trigonometry.

The user interface may be comprised by the communication device, and the user interface may be a touch pad formed as a circle. The center of the circle may correspond to the virtual position. The user interface may be a rotary switch or knob.

A change of the virtual position will lead to a uniformly change of the spatial information of the users.

The advantage of having a dynamically changed spatial information according to the virtual gaming environment will prevent the need of manually changing the spatial information when the user is moving around in the virtual gaming environment The local voice signal may be extended to at least a first local voice signal including the first spatial information and at least a second local voice signal including the first spatial information. The extension may be provided by an audio splitter or a power divider.

The input communication interface may comprise a primary audio input port and a secondary audio input port, wherein the primary audio input port may be configured to receive the first stereo audio signal transmitted by the second communication device, and wherein the secondary audio input port may be configured to receive the second stereo audio signal transmitted by the third communication device.

The output communication interface may comprise a primary audio output port and a secondary audio output port, wherein the primary audio output port may be configured to transmit the third stereo audio signal of the plurality of stereo audio signals comprising the first local voice signal and the second stereo audio signal to the second communication device, and wherein the secondary audio output port may be configured to transmit a fourth stereo audio signal of the plurality of stereo audio signals comprising the second local voice signal and the first stereo audio signal to the third communication device. The communication system may comprise an internal audio mixer configured to mix the first stereo audio signal and the second stereo audio signal into an internal audio signal.

The second communication device may be a subsequent communication device and the third communication device may be a preceding communication device relative to the first communication device.

The primary audio input port and the primary audio output port of the first communication device are coupled to the secondary audio output port and the secondary audio input port of the second communication device, respectively, and wherein the secondary audio input port and the secondary audio output port of the first communication device are coupled to the primary audio output port and the primary audio input port of the third communication device, respectively, and wherein each of the communication device of the plurality of communication devices comprises a first volume controller configured to control the sound level of the first local voice signal and the second local voice signal and a second volume controller configured to control the sound level of the internal audio signal and transmit the internal audio signal to the audio interface. The communication devices may be connected in a daisy chain configuration.

The local voice signal may comprise a third local voice signal, and wherein the communication device may comprise a third volume controller configured to control the sound level of the third local voice signal and transmit the third local voice signal to the audio interface.

The communication device may be configured to combine the output of the second volume controller with the output of the third volume controller generating a combined sound output signal and transmit the combined sound output signal to the audio interface.

The advantage of having the first volume controller and the second volume controller is that the user of the communication device is able to control the sound level of the local voice signal being transmitted to the other communication devices, i.e. the first local voice signal and the second local voice signal.

A further advantage of having the first volume controller and the second volume controller is that the user of the communication device is able to control the sound level of the received voices of the other users of the other communication devices separated from the local voice signal being transmitted to the other communication devices.

The plurality of communication devices may be connected to each other in an open communication loop.

Each of the communication device of the plurality of communication devices may comprise the user interface, or a host device may comprise the user interface. The host device may be connected wired or wirelessly to each communication device of the plurality of communication devices, or the plurality of communication devices may comprise a master communication device which is configured to communicate with the host device and distribute the relevant information to the slave communication devices which are part of the plurality of communication devices. The relevant information may for example be the virtual position and/or the spatial information.

The first local voice signal and the second local voice signal, or the local voice signal, may comprise a virtual left audio channel and a virtual right audio channel.

The plurality of communication devices may be an audio communication device or a telephone communication device, such as a smartphone or an IP telephone.

In a situation where a user wants to chat with another user of the communication device, and do not want the other to disturb the chatting, the user is able to communicate to one or more of the other users of the other communication devices to lower their sound level. Thereby, the communication device gives the user the possibility of controlling or affecting each sound level of each voice signal received by the communication device. The improved ability of controlling the sound level of voice signals has a side effect of improving the experience of gaming in a team.

The virtual sound environment may improve even more the experience of gaming in a team.

An advantage of the communication system is that the communication devices are easy to use and easy to couple together while keeping the convenience of each communication device to the respective user because the communication device can be placed within reach of the users allowing them personal controls.

The audio interface may be configured to receive the combined sound output signal and transmit the combined sound output signal to a hearing device, such as a headset, a headphone or a hearing aid with an own voice detection.

The audio interface may be configured to receive and transmit one or more stereo audio signals, such as the local voice signal from the user of the communication device, the combined sound output signal, the third local voice signal and/or the internal audio signal.

The communication device may receive the local voice signal from a microphone connected to the communication device via the first audio interface and via the second audio interface receives voice signals from other microphones connected to other communication devices, respectively.

In the sequentially inter-coupling of the communication devices the primary audio input port and the primary audio output port of the communication device may be coupled to the secondary audio output port and the secondary audio input port of the subsequent communication device, respectively, and the secondary audio input port and the secondary audio output port of the communication device may be coupled to the primary audio output port and the primary audio input port of the preceding communication device, respectively.

The communication system communicates the plurality of stereo audio signals, where the stereo audio signals may include the first stereo audio signal which may be transmitted by the subsequent communication device, and the stereo audio signals may further include the second stereo audio signal which may be transmitted by the preceding communication device. Additionally, the stereo audio signals may include the third stereo audio signal and the fourth stereo audio signal transmitted by the communication device.

In a use situation, the first stereo audio signal and the second stereo audio signal may comprise one or more voice signals of other users of other communication devices of the plurality of communication devices.

The primary audio input port and the primary output port may be combined into a primary audio port, and the secondary audio input port and the secondary audio output port may be combined into a secondary audio port. In one or more embodiments, the primary audio port may be configured so that the primary audio port may receive the first stereo audio signal from the subsequent communication device, and the primary audio port may be configured so that the primary audio output port may be able to transmit the third stereo audio signal to the subsequent communication device. In one or more embodiments, the secondary audio port may be configured so that the secondary audio port may receive the second stereo audio signal from the preceding communication device, and the secondary audio port may be configured so that the secondary audio output port may be able to transmit the fourth stereo audio signal to the preceding communication device.

The first and second volume controller may be an analog or a digital potentiometer.

The audio signals being transmitted between the communication devices may be either in stereo mode or in mono mode.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure.

In general, a hearing device includes i) an input unit such as a microphone for receiving an acoustic signal from a user's surroundings and/or the user's own voice and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

Figure 1A:
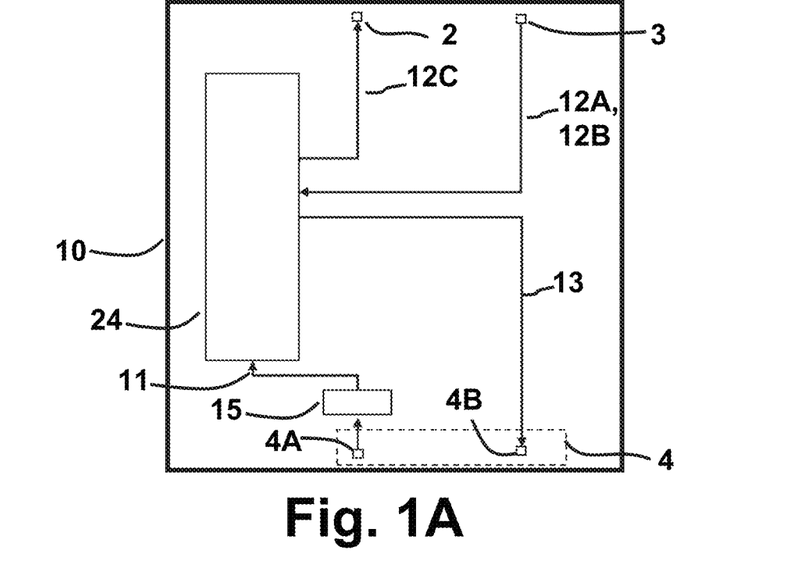
FIGS. 1A-1B, illustrate a communication device of the communication system.
Figure 1B:
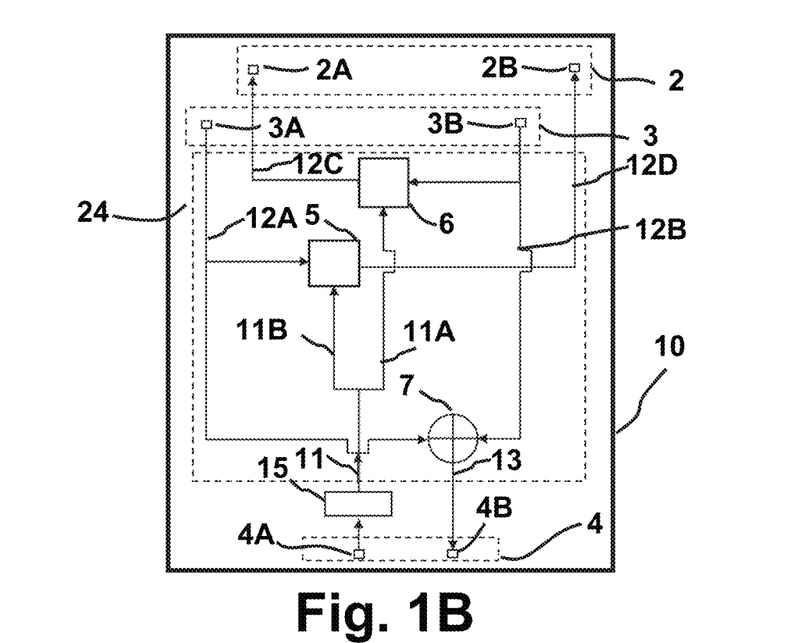

FIGS. 1A to 1B illustrate a communication device 10 of a communication system 1. The communication device 10 comprises a signal processing unit 24, an audio interface 4 configured to receive a local voice signal 11 of a user of the communication device 10. In this specific example, the audio interface 4 may receive the local voice signal from an auxiliary device, such as a hearing device, connected to an audio input interface 4A. The communication unit 10 comprises a binaural rendering unit 15 configured to render the local voice signal into a stereo local voice signal 11 based on a first spatial information. The first spatial information $\alpha_1$ may be stored in the binaural rendering unit 15 or provided by the user through a user interface 29 (not shown). The rendered local voice signal 11 is transmitted in this example to the signal processing unit 24. An input communication interface 3 of the communication device 10 is configured to receive the first stereo audio signal 12A and a second stereo audio signal 12B of the plurality of stereo audio signals transmitted by a second communication device 10B (not shown) and a third communication device 10C (not shown), respectively. The first stereo audio signal 12A comprises a second voice signal of a second user of the second communication device 10B, and where the second voice signal includes a second spatial information $α_2$, and wherein the second stereo audio signal 12B comprises a third voice signal of a third user of the third communication device 10C, and where the third voice signal includes a third spatial information $α_3$. In this example, the first stereo audio signal 12A and the second stereo audio signal 12B is transmitted to the signal processing unit 24. Furthermore, in this specific example, the signal processing unit 24 is connected to an output communication interface 2 configured to transmit a third stereo audio signal 12C of the plurality of stereo audio signals comprising the local voice signal 11 provided with the first spatial information $α_1$ to the second communication device 10B and the third communication device 10C. The first stereo audio signal and the second stereo audio signal is transmitted 13 to the audio interface 4 and forwarded via an audio output interface 4B to an auxiliary device, such as a hearing device, connected to the audio output interface 4B. The user of the communication device 10 experiences a virtual sound environment 25 (not shown), wherein the second voice signal and the third voice signal is positioned in the virtual sound environment 25 based on the second spatial information $α_2$ and the third spatial information $α_3$, respectively.

FIG. 1B illustrates an example of the communication device 10, where the signal processing unit 24 is configured to extend the local voice signal 11 into a first local voice signal 11A including the first spatial information $α_1$ and at least a second local voice signal 11B including the first spatial information $α_1$. The input communication interface 3 comprises a primary audio input port 3A and a secondary audio input port 3B, wherein the primary audio input port 3A is configured to receive the first stereo audio signal 12A transmitted by the second communication device 10B, and wherein the secondary audio input port 3B is configured to receive the second stereo audio signal 12B transmitted by the third communication device 10C. The output communication interface 2 comprises a primary audio output port 2A and a secondary audio output port 2B, wherein the primary audio output port 2A is configured to transmit the third stereo audio signal 12C of the plurality of stereo audio signals comprising the first local voice signal 11A and the second stereo audio signal 12B to the second communication device 10B. The third stereo audio signal 12C is provided by for example a first combiner 5 in the signal processing unit 24. The secondary audio output port 2B is configured to transmit a fourth stereo audio signal 12D of the plurality of stereo audio signals comprising the second local voice signal 11B and the first stereo audio signal 12A to the third communication device 10C. The fourth stereo audio signal 12C is provided by for example a second combiner 6 in the signal processing unit 24. The communication system 1 may comprise an internal audio mixer 7 configured to mix the first stereo audio signal 12A and the second stereo audio signal 12B into an internal audio signal 13. In this example, the internal audio mixer 7 is positioned in the signal processing unit 24.

Figure 2:
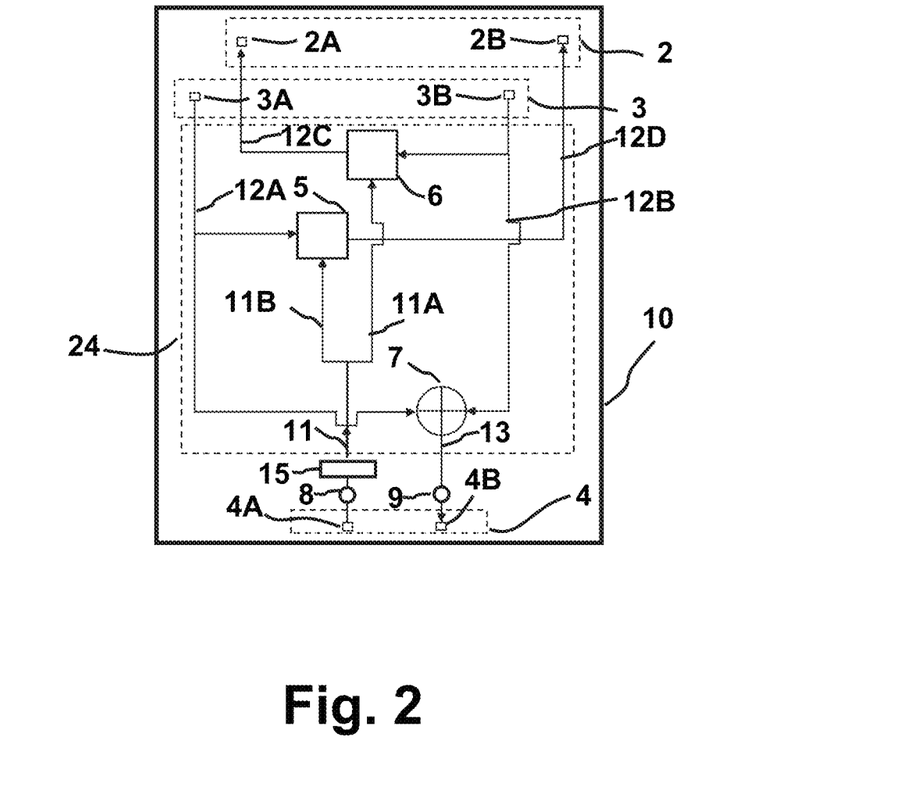
FIG. 2, illustrates a communication device comprising a first volume controller and a second volume controller.

FIG. 2 shows a communication device 10 comprising a first volume controller 8 configured to control the sound level of the local voice signal 11 and a second volume controller 9 configured to control the sound level of the internal audio signal 13. In a different example of the communication device 10 the first volume controller 8 may be located within the signal processing unit 24 and after the extending of the local voice signal 11 into the first local voice signal 11A and the second local voice signal 11B. Thereby, the first volume controller 8 is configured to control and adjust the volume of both the local voice signal 11A and the second local voice signal 11B separately.

Figure 3A:
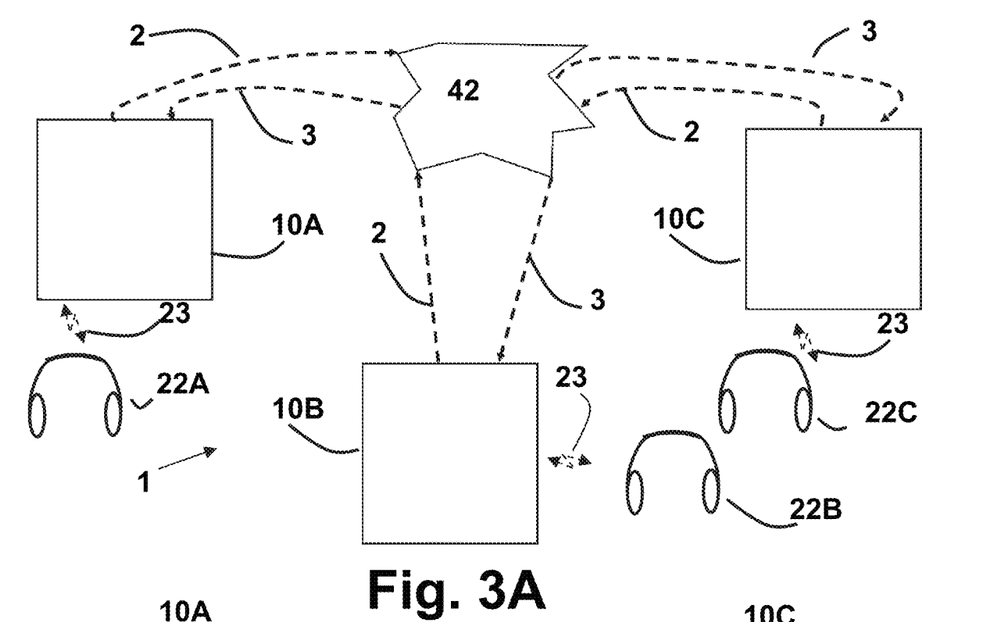
FIGS. 3A-3B, illustrate the communication system in different examples.
Figure 3B:
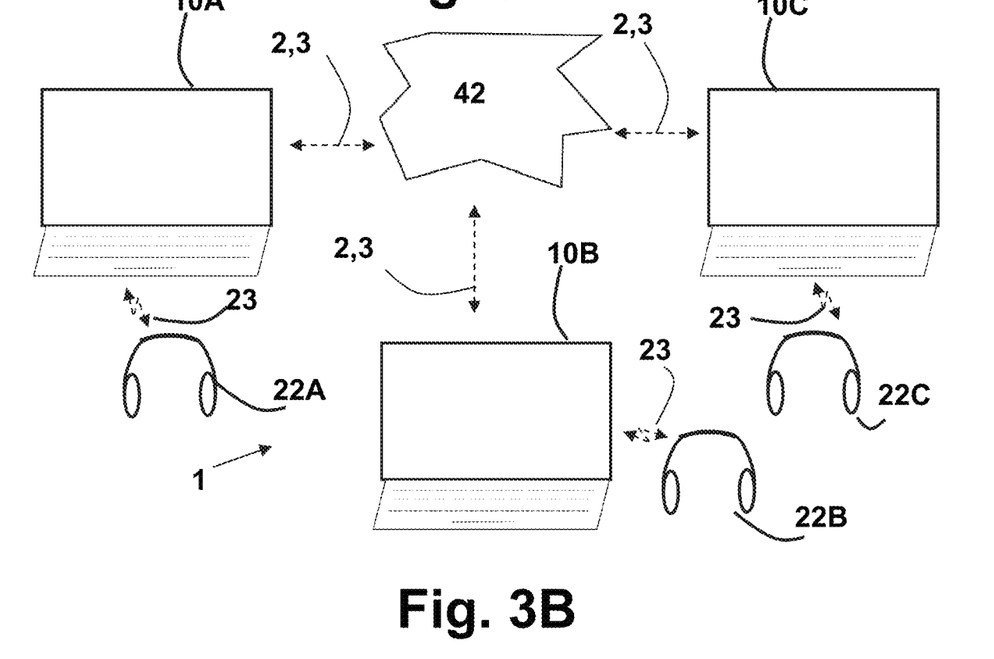

FIGS. 3A and 3B illustrate the communication system in different examples. In FIG. 3A the communication system 1 comprises three communication devices (10A, 10B and 10C), where each communication device (10A, 10B and 10C) may for example be a smartphone or an audio game controller. In this specific example, the communication system 1 comprises a server 42 including the audio mixer 7. Each communication device (10A, 10B and 10C) is configured to transmit the local voice signal 11 to the server 42 via the output communication interface 2, and the server 42 is configured to mix the local voice signals 11 from the communication devices (10A, 10B and 10C) and transmit wirelessly or wired the mixed local voice signals, denoted as the internal audio signal 13, to the respective input communication interfaces 3 of the respective communication devices (10A, 10B and 10C). The audio mixer 7 is configured to mix the local voice signals such that the respective communication device (10A, 10B and 10C) does not receive the local voice signal 11 relating to the respective communication device (10A, 10B and 10C). Instead the respective communication device (10A, 10B and 10C) receives the local voice signals from the other communication devices (10A, 10B and 10C).

In another example the communication device (10A, 10B and 10C) is configured to communicate wirelessly or wired via the output communication unit 2 the first stereo audio signal 12A and the second stereo audio signal 12B to the server. The server is configured to mix the first stereo audio signal 12A and the second stereo audio signal 12B, and transmit the first stereo audio signal 12A and the second stereo audio signal 12B mixed together, denoted as the internal audio signal 13, to the input communication interface 3.

Additionally, each of the communication devices (10A, 10B and 10C) is connected 23 to for example a hearing device 22, such as a headset, where the hearing device 22 receives the internal audio signal 13 wired or wirelessly 23.

Alternatively, each communication device of the plurality of communication devices may comprise the audio mixer, and in this example, the server is not needed for the mixing.

FIG. 3B illustrates a similar example as illustrated in FIG. 3A, however, in FIG. 3B each communication device is a computer, such as a laptop, connected via the input and output communication interface (2, 3) and via a long range communication link to a server. The example in FIG. 3B, illustrates the communication system 1 in an online conference call.

The long range communication link may be part of a telephone network, internet network or any wireless or wired long range communication network.

The audio mixer may be an 1 to N mixer. The audio mixer is configured to mix the stereo audio signals and remove any local voice signal in relative to the communication device.

Figures 4A, 4B:
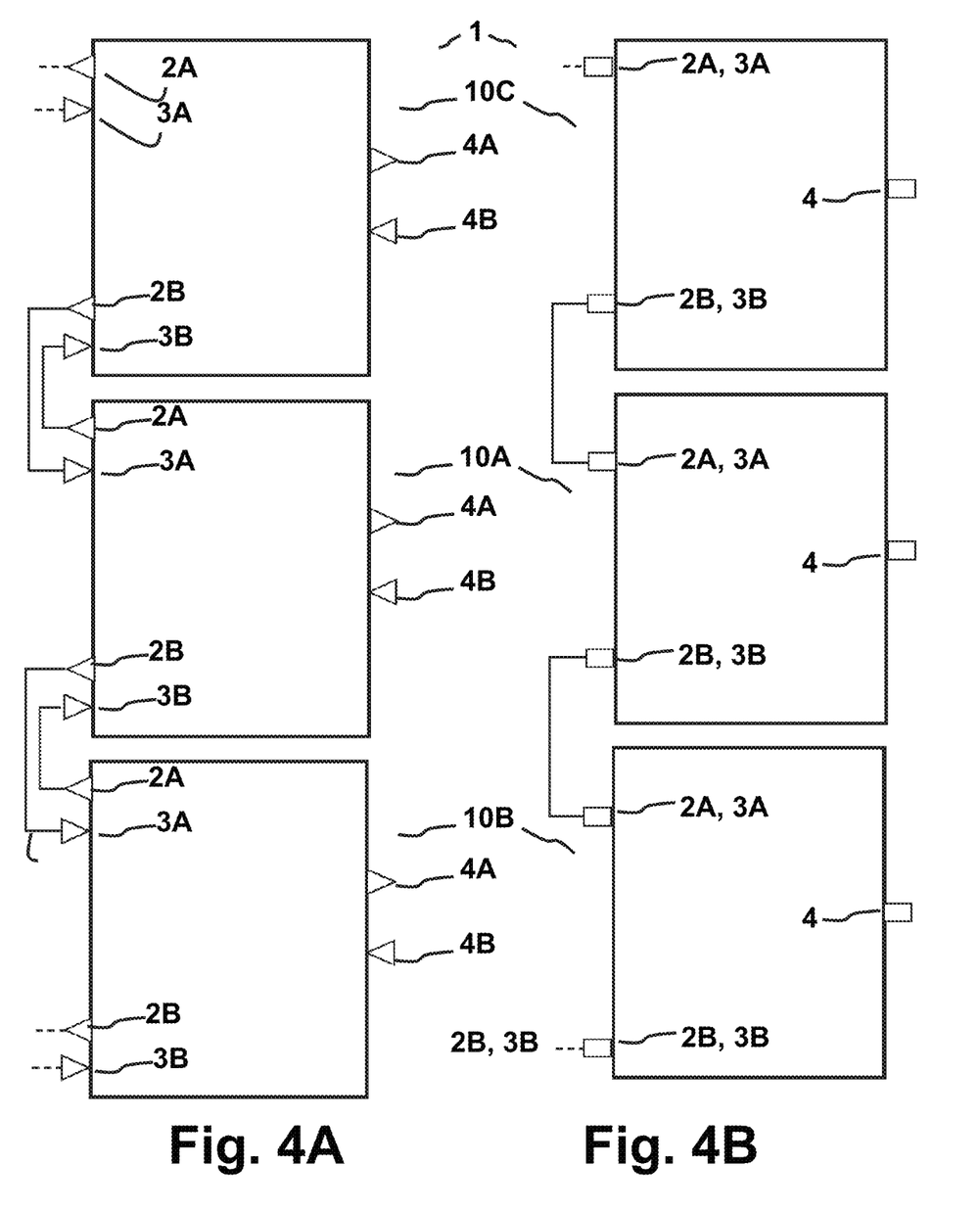
FIGS. 4A-4B, illustrate an example of the communication system.

FIGS. 4A and 4B illustrate an example of the communication system 1 comprising a plurality of communication devices (10A, 10B and 10C). For example, the second communication device 10B is the subsequent communication device 10B and the third communication device 10C is the preceding communication device 10C.

In this specific example, each communication device (10A, 10B, 10C) may comprise a line transformer connected to both the primary audio input port 3A and the primary audio output port 2B or to the secondary audio input port 3B and secondary audio output port 2B. The line transformer has to be connected similarly in all communication devices (10A, 10B and 10C) of the communication system 1. The line transformer is used for eliminating ground loop noise which is generated by having the communication devices wired interconnected and connected to the same power supply network.

In FIG. 4A the communication devices are interconnected with two wires. Between the communication device 10A and the subsequent communication device 10C a first wire is connecting the primary audio input port 3A of the communication device 10A with the secondary audio output port 2B of the subsequent communication device 10C, and a second wire is connecting the primary audio output port 2A of the communication device 10A with the secondary audio input port 3B of the subsequence communication device 10C. Additionally, a third wire is connecting the secondary audio input port 3B of the communication device 10A with the primary audio output port 2A of the preceding communication device 10B, and a fourth wire is connecting the secondary audio output port 2B of the communication device 10A with the primary audio input port 3A of the preceding communication device 10B. In this example, the audio interface comprises a first input interface 4A and a second audio interface 4B, where the first audio interface 4A is configured to receive the local voice signal 11 from a hearing device, and the second audio interface 4B is configured to transmit the internal audio signal 13 mixed or unmixed into the hearing device (the hearing device is not shown in FIG. 4A).

FIG. 4B shows a similar example as illustrated in FIG. 4a, however, in the example in FIG. 4B, the interconnections between the communication devices (10, 10B and 10C) are provided via a single wire. In this example, the input communication interface 3 and the output communication interface 2 are combined into a single communication port. Additional, the audio interface 4 is in this particular example a single port configured to receive the local voice signal 11 from a hearing device 22 and to transmit the internal audio signal 13 mixed or unmixed into the hearing device 22 (the hearing device is not shown in FIG. 4B).

Figure 5A:
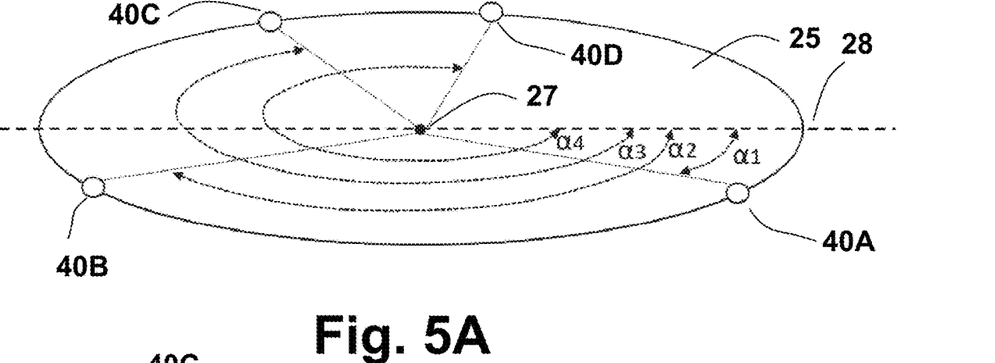
FIGS. 5A-5B, illustrate examples of the virtual sound environment.
Figure 5B:
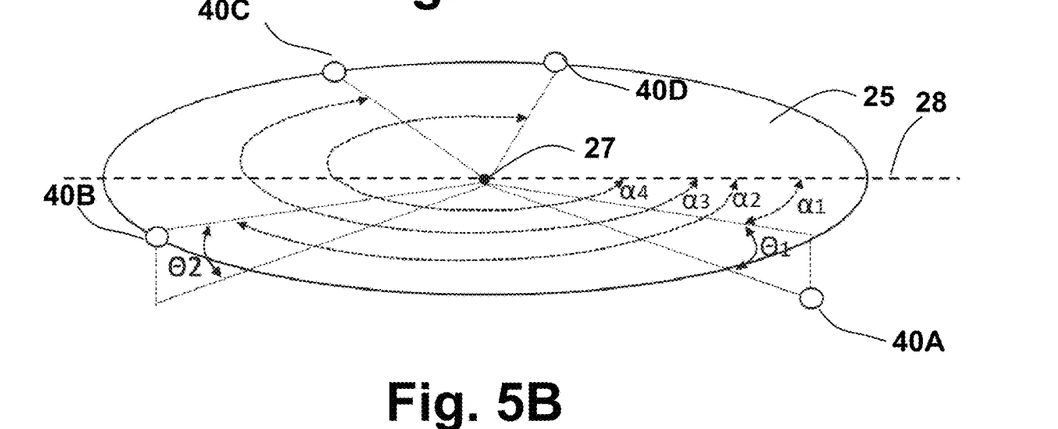

FIGS. 5A and 5B illustrate different examples of the virtual sound environment 25 including four users where each of the users are positioned (40A, 40B, 40C, and 40D) according to a spatial information ($\alpha_1$, $\alpha_2$, $\alpha_3$, and $\alpha_4$). The spatial information ($\alpha_1$, $\alpha_2$, $\alpha_3$, and $\alpha_4$) is distributed based on the virtual position 27 and the main axis 28.

In FIG. 5A, the users are distributed in the same plane of the virtual sound environment 25, i.e. the elevation angle $\Theta$ is the same for all users.

In FIG. 5B, the users 40A and 40B may be elevated with elevation angle $\Theta_1$ and $\Theta_2$ respectively. The users 40A and 40B will experience that the voices from the other users (40C and 40D) may come from a direction in the right-left plane and from a direction in the elevation plane.

Figure 6:
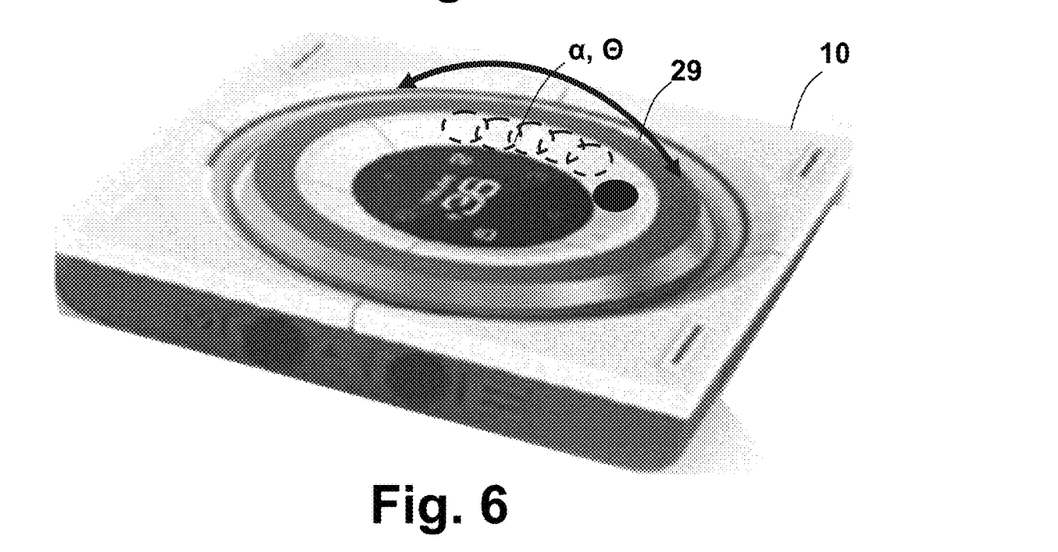
FIG. 6 illustrates the communication device being an audio game controller.

FIG. 6 illustrates the communication device 10 being an audio game controller. In this example, the user interface 29 for determining the spatial information $\alpha$ and/or the elevation angle $\Theta$ of the local voice signal 11 is a touch pad or a rotary switch or knob.

Figure 7A:
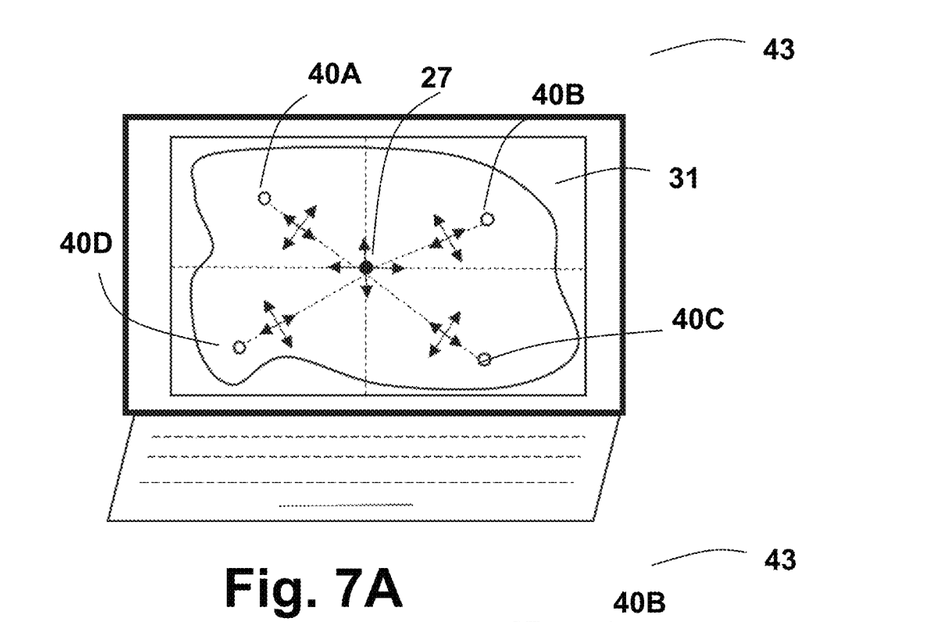
FIGS. 7A and 7B, illustrate the spatial information and the virtual position.
Figure 7B:
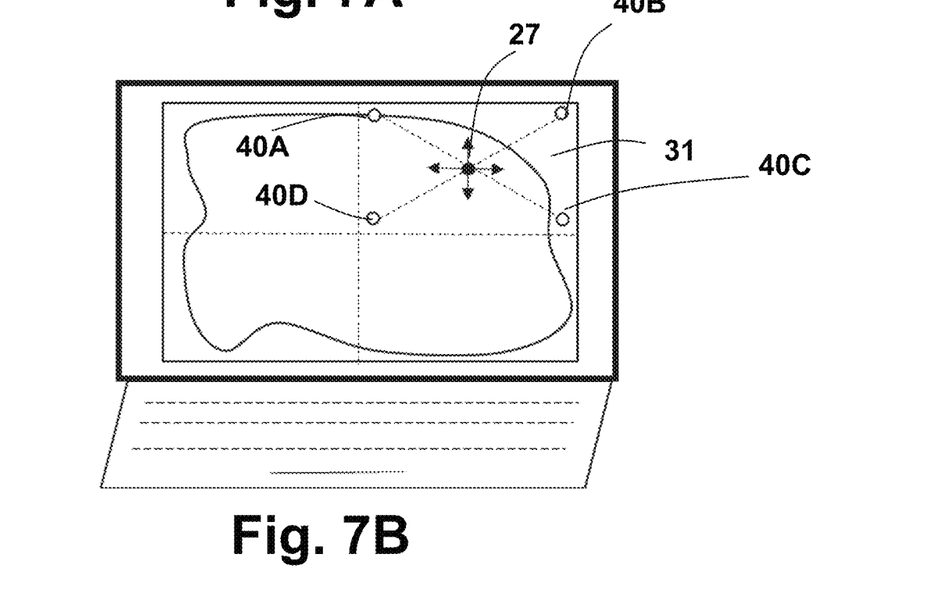

FIGS. 7A and 7B illustrate that the spatial information $\alpha$ and/or the elevation angle $\Theta$ and/or the virtual position 27 can be determined from a host device 43 which is connectable to each of the communication device 10 or at least one of the communication device 10. The host device 43 may be for example a laptop or a computer which is connectable to each of the communication device 10. The connection may be a wireless connection between the transceiver comprised by the communication device 10 and a transceiver within the host device 43. The connection between the host device 43 and one or more communication devices 10 may be wired.

In FIG. 7A, the users are participants to a video game, where the position of the users are distributed in a virtual gaming environment based on a spatial information $\alpha$ and/or the elevation angle $\Theta$. The virtual gaming environment 31 are divided into four quadrants where each user (40A, 40B, 40C and 40D) is positioned into each quadrant, and where the virtual position 27 is in the center of the virtual sound environment 31.

In FIG. 7B, the virtual position 27 has moved into the center of one of the quadrants. The position of each user is transferred into the quadrant where the virtual position 27 is placed.

Figure 8A:
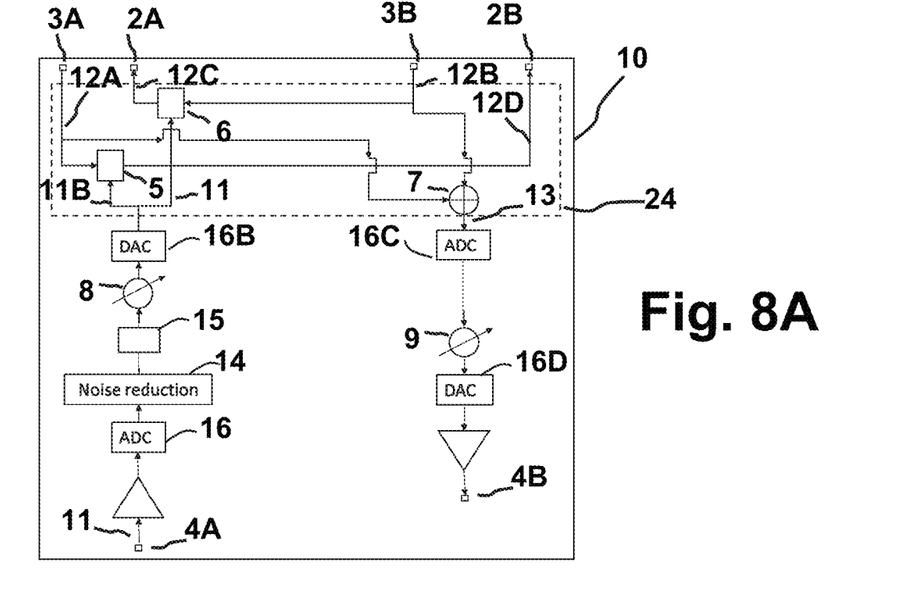
FIGS. 8A and 8B illustrate examples of the communication device.
Figure 8B:
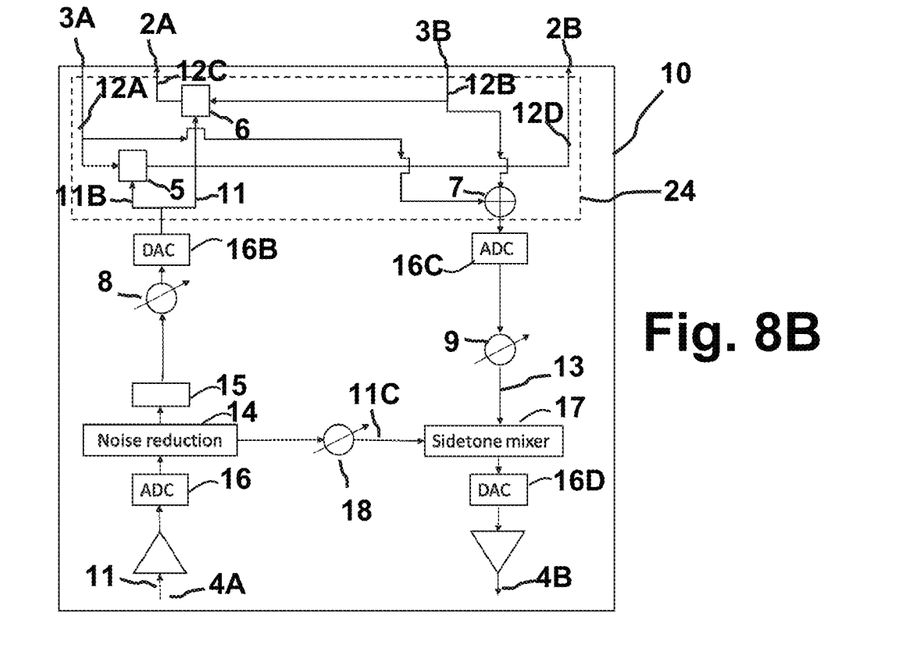

FIGS. 8A and 8B show different example of the communication device 10. FIG. 8A shows the communication device disclosed in FIGS. 1A and 1B including additional components which are optional. By including signal processing component, such as a noise reduction component 14 results in an improved signal-to-noise ratio of the local voice signal 11, and the quality of the local voice signal (11A and 11B) received by the other communication devices may be improved even more. The binaural rendering unit 15 is positioned after the noise reduction component. Alternatively, the binaural rendering unit 15 may be placed just after the analog-to-digital converter 16A. The communication device 10 is configured in such a way that communication between the devices may provide a delay of the local voice signals 11 of the users which is not noticeable for the user. Since the delay is small, the additional delay which may be caused by the noise reduction component 14 will not result in a delay of the local voice signals 11 which is noticeable for the users.

The sound level of the first local voice signal 11A and the second local voice signal 11B is controlled by the first volume controller 8.

Additionally, an analog-to-digital converter 16A receives the local voice signal 11 in analog domain and converts the local voice signal 11 into digital domain before the local voice signal 11 is signal processed in the noise reduction component 14. A digital-to-analog converter 16B converts the local voice signal 11 in digital domain into analog domain before or after the local voice signal 11 is extended.

The sound level of the internal voice signal 13 is controlled by the second volume controller 9.

The internal audio signal 13 which is converted from analog domain to digital domain by the analog-to-digital converter 16C is converted back to analog domain by the digital-to-analog converter 16D.

FIG. 8B shows a similar communication device 10 as disclosed in FIG. 8A with additional features, such as a sidetone mixer 17 which in this particular example is configured to mix a third local voice signal 11C extended from the local voice signal 11 with the internal audio signal 13 in digital domain. Furthermore, the communication device 11 comprises a third volume controller 18 which is configured to control the sound level of the third local voice signal 11C.

The internal audio signal 13 which is converted from analog domain to digital domain by the analog-to-digital converter 16C is converted back to analog domain by the digital-to-analog converter 16D.

Figure 9:
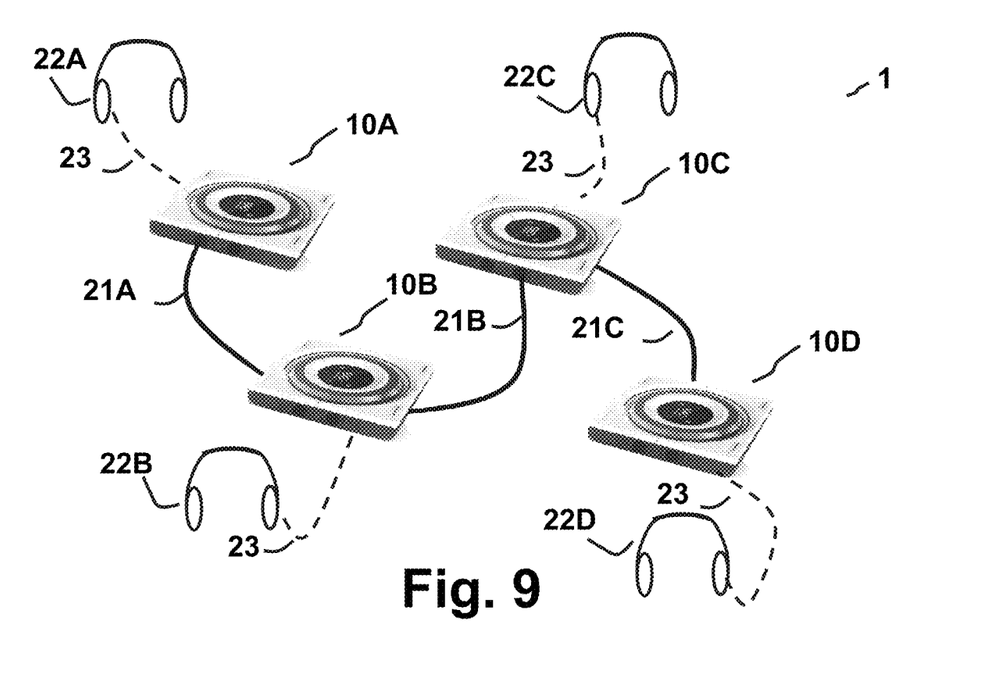
FIG. 9 illustrates the communication system including a plurality of communication devices.

FIG. 9 illustrates the communication system 1 including a plurality of communication devices (10A, 10B, 10C, 10D) wired interconnected to each other by a single wire (21A, 21B, 21C) between each communication device except between the two communication devices (10A and 10D). Furthermore, each communication device (10A, 10B, 10C, 10D) is coupled 23 to a headset (22A, 22B, 22C, 22D) either wirelessly or wired.

Additionally, FIG. 9 shows a gaming situation where each gamer/user has a communication device (10A, 10B, 10C, 10D) and a headset (22A, 22B, 22C, 22D) connected to the communication device (10A, 10B, 10C, 10D). Each communication device (10A, 10B, 10C, 10D) may furthermore be connected to a gaming device (not shown in FIG. 9). The gamer/user may now be able to chat to each other via the communication devices (10A, 10B, 10C, 10D) and the respective headsets (22A, 22B, 22C, 22D).

Figure 10:
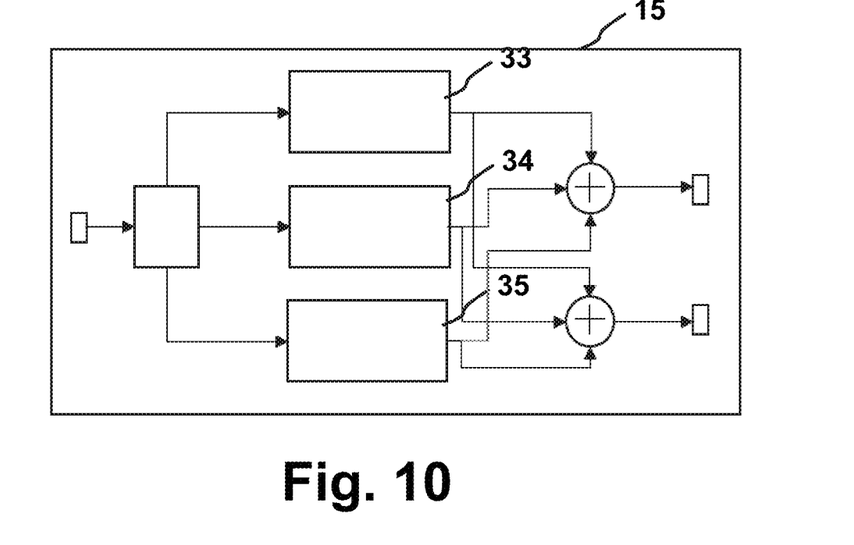
FIG. 10 illustrates a binaural rendering unit.

FIG. 10 illustrates the binaural rendering unit 15 including a direct head related transfer function unit 33, a cross head related transfer function unit 34 and a cross head related transfer function 35. In this example the local voice signal 11 is divided and transmitted to each of the function units (33, 34, 35). The output of each function unit (33, 34, 35) are divided into a virtual left audio channel and a virtual right audio channel.

The invention claimed is:

1. A communication system for communication of a plurality of stereo audio signals between a plurality of communication devices, wherein the plurality of communication devices comprises a first communication device, a second communication device and at least a third communication device, wherein the first communication device of the plurality of communication devices comprises:
   a signal processing unit,
   an audio interface configured to receive a local voice signal of a user of the first communication device,
   a binaural rendering unit configured to render the local voice signal into a stereo local voice signal based on a first spatial information,
   an input communication interface configured to receive a first stereo audio signal and a second stereo audio signal of the plurality of stereo audio signals transmitted by the second communication device and the third communication device, respectively, wherein the first stereo audio signal comprises a second voice signal of a second user of the second communication device, and where the second voice signal includes a second spatial information, and wherein the second stereo audio signal comprises a third voice signal of a third user of the third communication device, and where the third voice signal includes a third spatial information,
   an output communication interface configured to transmit a third stereo audio signal of the plurality of stereo audio signals comprising the local voice signal provided with the first spatial information to the second communication device and the third communication device, and
   a user interface configured to receive user input to change a virtual position of the user of the first communication device in a virtual sound environment in which said second and third users occupy respective virtual positions, said user interface determining the first spatial information, which is transmitted to the second and third communication devices as part of the third stereo audio signal, according to the user input;
   wherein the virtual positions of the user of the first communication device, the second user, and the third user in the virtual sound environment are represented by the first spatial information, the second spatial information, and the third spatial information, respectively, and
   wherein the first stereo audio signal and the second stereo audio signal is transmitted to the audio interface, and the user of the communication device experiences the virtual sound environment, wherein the first voice signal, the second voice signal, and the third voice signal are positioned in the virtual sound environment based on the first spatial information, the second spatial information, and the third spatial information, respectively.

2. A communication system according to claim 1, where the audio interface is a speaker and/or an audio port configured to receive a hearing device, such as a headset or a headphone.

3. A communication system according to claim 1, wherein the local voice signal is a stereo audio signal.

4. A communication system according to claim 1, wherein each of the communication device of the plurality of communication devices is configured to communicate wirelessly or wired with each other via the input communication interface and the output communication interface.

5. A communication system according to claim 1, wherein
   the local voice signal is extended to at least a first local voice signal including the first spatial information and at least a second local voice signal including the first spatial information,
   the input communication interface comprises a primary audio input port and a secondary audio input port, wherein the primary audio input port is configured to receive the first stereo audio signal transmitted by the second communication device, and wherein the secondary audio input port is configured to receive the second stereo audio signal transmitted by the third communication device,
   the output communication interface comprises a primary audio output port and a secondary audio output port, wherein the primary audio output port is configured to transmit the third stereo audio signal of the plurality of stereo audio signals comprising the first local voice signal and the second stereo audio signal to the second communication device, and wherein the secondary audio output port is configured to transmit a fourth stereo audio signal of the plurality of stereo audio signals comprising the second local voice signal and the first stereo audio signal to the third communication device, and
   wherein the first communication device comprises an internal audio mixer configured to mix the first stereo audio signal and the second stereo audio signal into an internal audio signal.

6. A communication system according to claim 5, wherein the second communication device is a subsequent communication device and the third communication device is a preceding communication device relative to the first communication device.

7. A communication system according to claim 5, wherein the primary audio input port and the primary audio output port of the first communication device are coupled to the secondary audio output port and the secondary audio input port of the second communication device, respectively, and wherein the secondary audio input port and the secondary audio output port of the first communication device are coupled to the primary audio output port and the primary audio input port of the third communication device, respectively, and wherein the first communication device comprises a first volume controller configured to control the sound level of the first local voice signal and the second local voice signal and a second volume controller configured to control the sound level of the internal audio signal and transmit the internal audio signal to the audio interface.

8. A communication system according to claim 1, wherein each of the first, second, and third spatial information comprises an azimuth angle and/or elevation angle, where the angles are determined with respect to a main axis intersecting the corresponding virtual position in the virtual sound environment.

9. A communication system according to claim 8, wherein the virtual position of each of the respective users of the plurality of communication devices is determined via a user interface or dynamically changed according to a virtual gaming environment.

10. A communication system according to claim 1, wherein each of the first, second, and third spatial information is determined via a user interface or dynamically changed according to a virtual gaming environment.

11. A communication system according to claim 9, wherein each of the plurality of communication devices comprises the user interface.

12. A communication system according to claim 1, wherein the binaural rendering unit is configured to apply a direct head related transfer function, a cross head related transfer function and/or a reverberation function to the local voice signal based on the spatial information.

13. A communication system according to claim 1, wherein the first local voice signal and the second local voice signal, or the local voice signal, comprises a virtual left audio channel and a virtual right audio channel.

14. A communication system according to claim 1, wherein the input communication interface and the output communication interface is a transceiver interface.

15. A communication system according to claim 1, wherein the virtual sound environment is part of a virtual gaming environment, and the user interface is operative to display virtual positions in the virtual gaming environment associated with the first, second, and third communication devices, the user input being used by the user interface to change the virtual position of the first communication device in the virtual gaming environment.

* * * * *